July 5, 1927.　　　　　　　　　　　　　　　　　　　　1,634,474
N. E. WAHLBERG
BRAKE MECHANISM FOR STEERING WHEELS
Filed June 25, 1924　　　　4 Sheets-Sheet 1

Inventor
Nils Erik Wahlberg

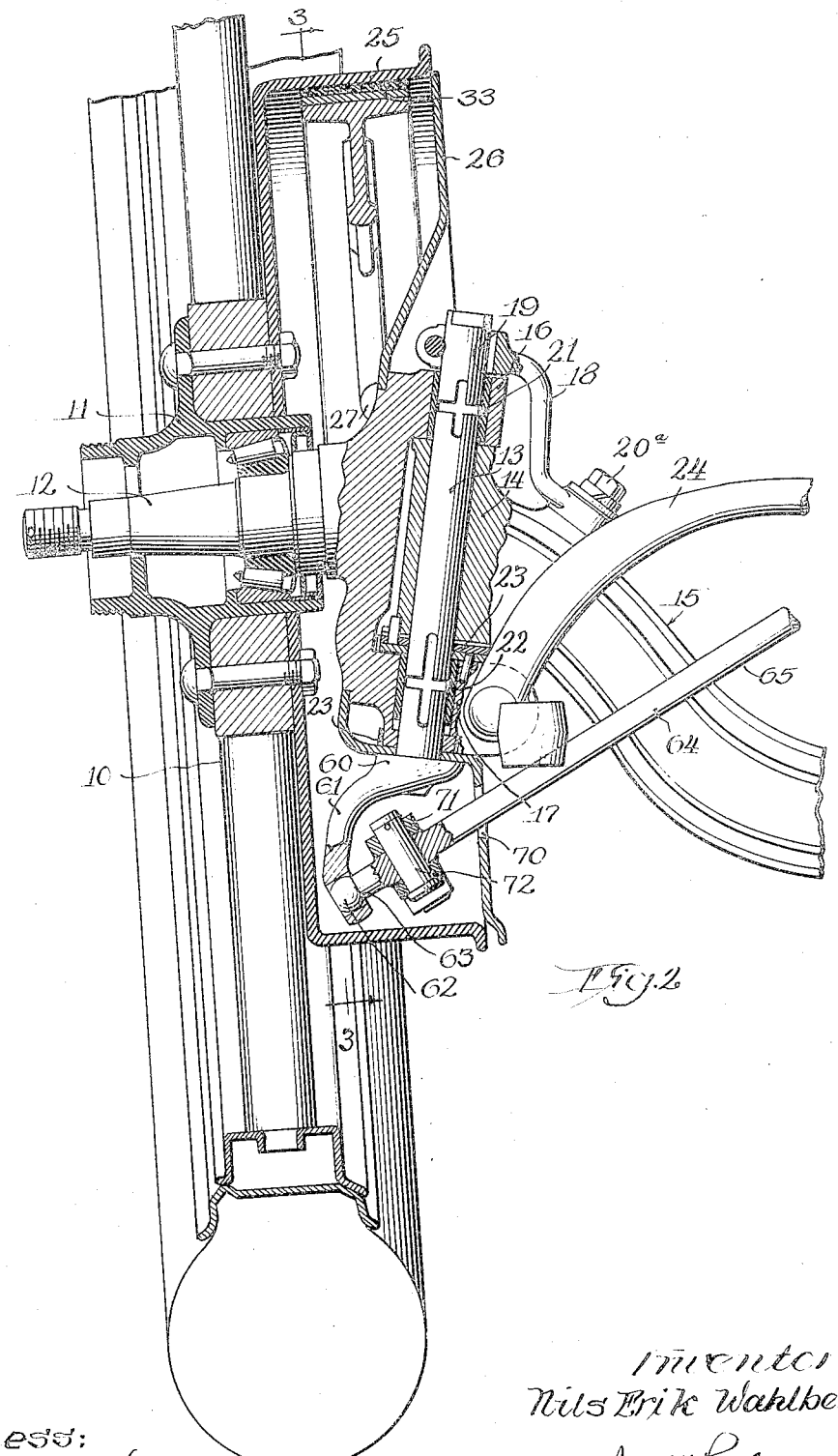

July 5, 1927.

N. E. WAHLBERG 1,634,474

BRAKE MECHANISM FOR STEERING WHEELS

Filed June 25, 1924    4 Sheets-Sheet 3

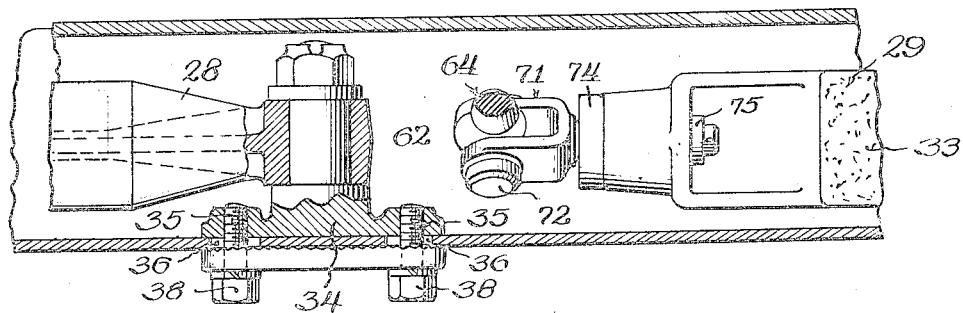
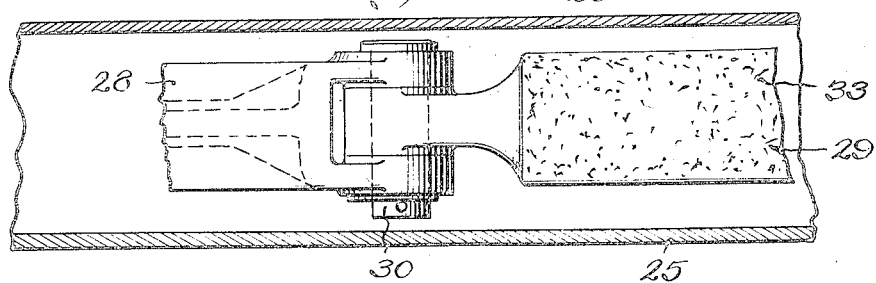
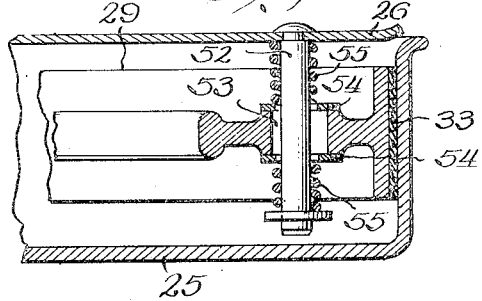

Patented July 5, 1927.

1,634,474

UNITED STATES PATENT OFFICE.

NILS ERIK WAHLBERG, OF KENOSHA, WISCONSIN, ASSIGNOR TO NASH MOTORS COMPANY, OF KENOSHA, WISCONSIN, A CORPORATION OF MARYLAND.

BRAKE MECHANISM FOR STEERING WHEELS.

Application filed June 25, 1924. Serial No. 722,219.

This invention relates to brake mechanism for motor vehicles and particularly to brakes for wheels which are pivotally supported so that they may be used for steering the vehicle.

The principal object of the invention is to provide a simple and durable construction wherein the operation of the brake will be unaffected by the pivotal steering movements of the wheel. More particularly, my invention relates to the provision of operating mechanism for a brake of the class described wherein a minimum of moving of wearing parts connecting the vehicle and the brake drum is required. Other objects of my invention will appear from time to time as the description proceeds.

The invention may best be understood by reference to the accompanying drawings in which:

Figure 2 is an enlarged vertical cross section of a wheel taken on line 2—2 of Figure 1.

Figure 4 is an enlarged cross section taken on line 4—4 of Figure 3.

Figure 5 is a cross section taken on line 5—5 of Figure 3.

Figure 6 is a cross section taken on line 6—6 of Figure 3.

Figure 1:
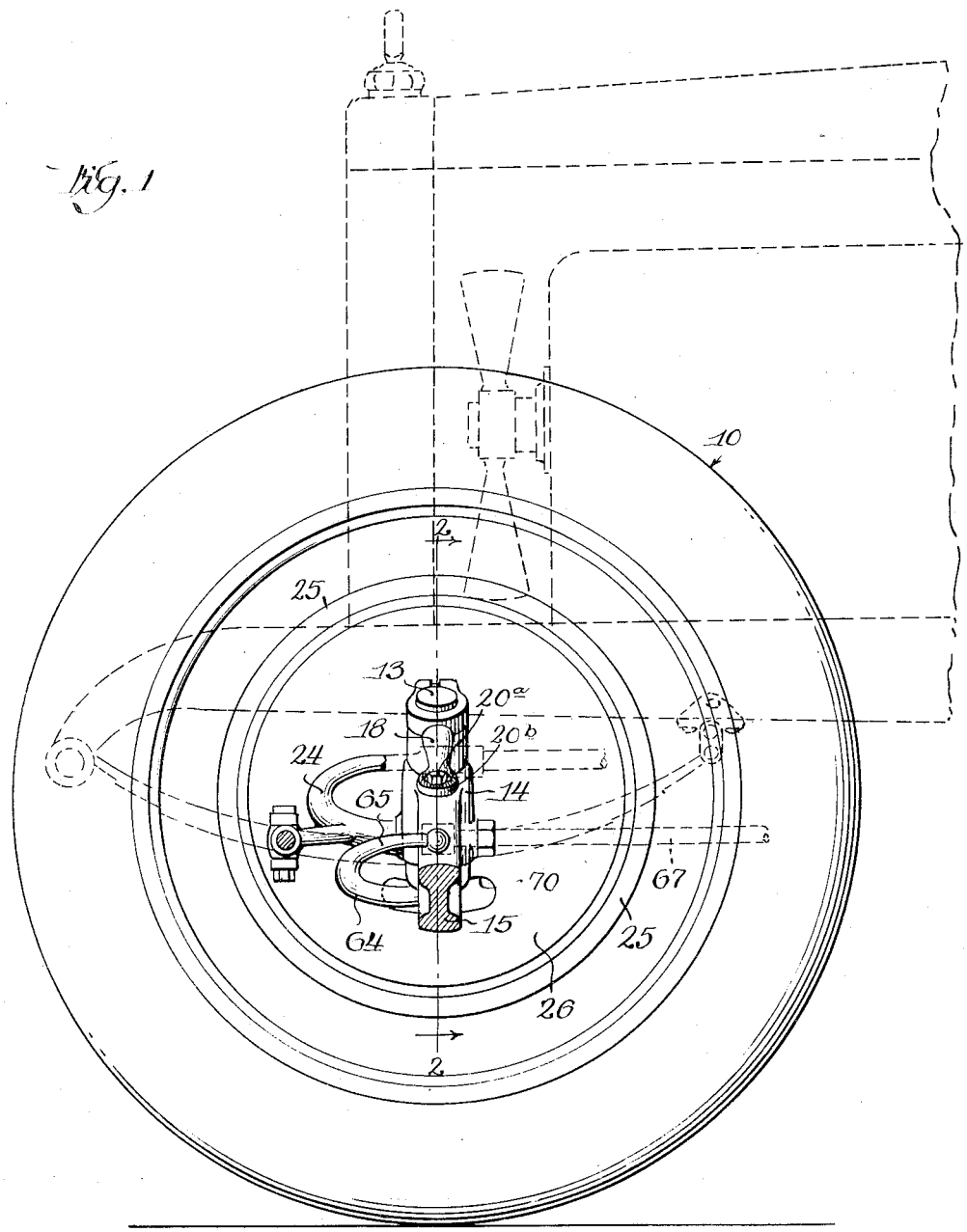
Figure 1 is a fragmentary view of an automobile and showing the application thereto of one form of brake mechanism, in which my invention may be employed.
Figure 7:
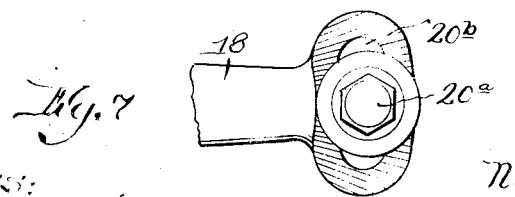
Figure 7 is a detail of the pivot pin adjusting device.

Referring now to the details shown in the drawings, 10 indicates generally a wheel, herein shown of the wooden spoke type with a metal hub 11 mounted on a spindle 12 and movable about a pivot pin 13 extending through pivot support 14 of the vehicle axle 15 and upper and lower knuckle arms 16 and 17 respectively, carried by the wheel spindle 12. As shown herein, said pivot pin is fixed against rotation relative to the axle by an adjusting arm 18 keyed at 19 to the upper end of said pin and extending downwardly into adjustable connection with the axle 15 by means of a bolt 20$^a$ working in a curved slot 20$^b$ formed concentric with the pivot pin 13. The purpose of this adjustment device will hereinafter more fully appear. Suitable bearing sleeves 21 and 22 are carried by the arms 16 and 17 for bearing on said pivot pin, and a thrust bearing indicated generally at 23 is interposed between said lower arm and the axle support 14. The pivot is steered through arm 24 secured to the spindle in the usual manner.

Mounted on the wheel 10 is a brake drum 25. A cover plate 26 is fixed to the spindle by bolts 27—27 and forms an enclosure for the brake band.

The brake band shown herein is of the expanding type and comprises two parts 28, 29 hinged together at their upper ends by a pin 30 and each having frictional members 33 of the usual form adapted for engagement with the brake drum. The brake band is supported with respect to the axle by suitable means herein including an adjustable connecting bracket 34 pivotally connected to the extremity of one of the brake shoe members 28 as shown in detail in Figure 4. This connecting bracket forms a fixed fulcrum for the band and is secured to the cover plate 26 by a pair of bolts 35, 35 threaded in said bracket and extending through slots 36, 36 in the cover plate. The bracket may be corrugated as shown to engage the exterior of the cover plate. The heads 38, 38 of bolts 35, 35 are thus in position to be adjusted from the exterior of said plate and the bracket 34 shifted longitudinally or substantially tangential to the brake band to adjust the position of the fixed end of said brake band as required.

Figure 3:
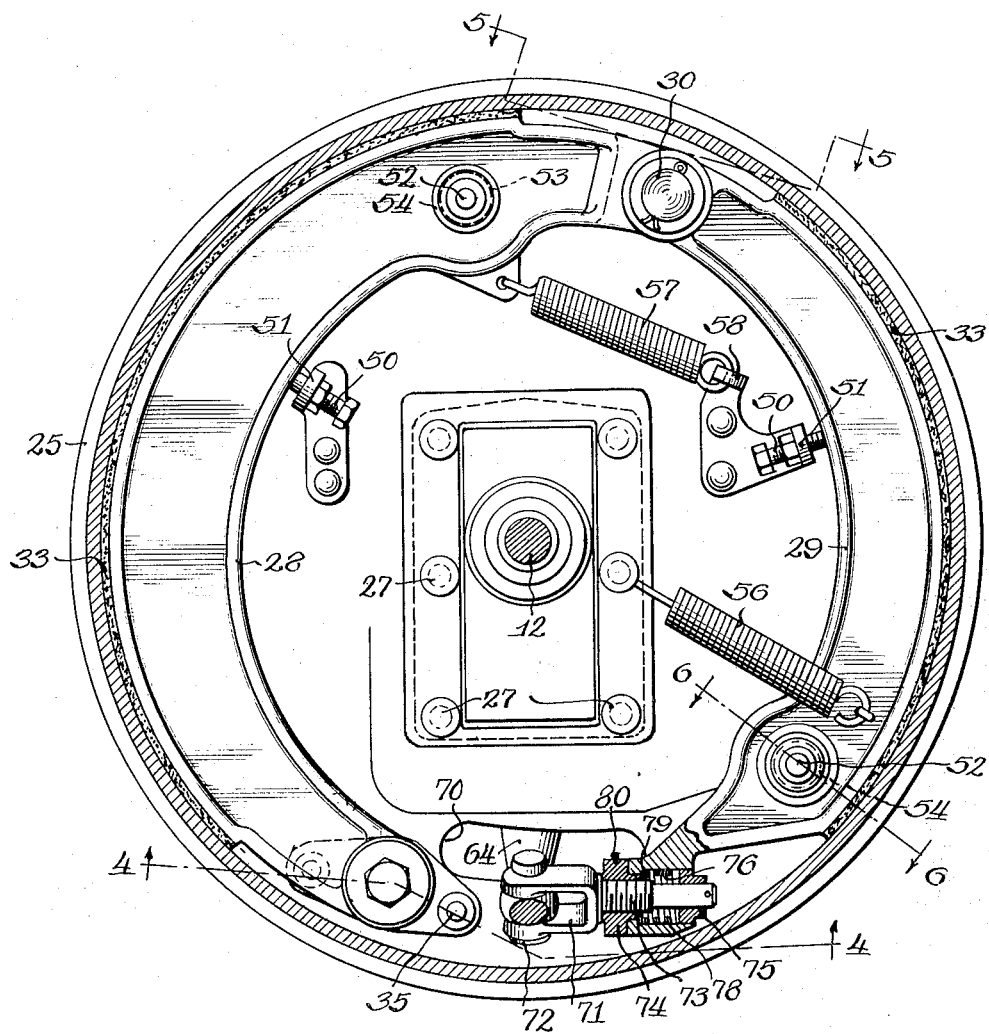
Figure 3 is a section taken on line 3—3 of Figure 2.

Means providing a floating support for the brake band comprises a plurality of supporting pins 52, 52 mounted on the cover plate 26 and extending inwardly through an enlarged aperture 53 in brake members 28, 29. In the form shown herein, said supporting pins are provided with a pair of washers 54, 54 secured under tension of oppositely disposed compression springs 55, 55 coiled on the opposite ends of said pin and maintaining said washers in engagement against opposite sides of the associated brake member. The free end of brake member 29 is supported by a radially disposed tension spring 56 connected to the cover plate 26 and a tangentially disposed spring 57 is connected between a bracket 58 carried on the cover plate 26 and the relatively free end of the brake member 28 adjacent its point of pivotal connection with brake member 29. Means are provided for limiting the inward radial movement of the brake band members as shown herein, comprising a plurality of set screws 50, 50 on brackets 51, 51 fixed on the cover plate 26. The set screws extend into adjustable contact with the inner surface of the brake band members 28 and 29 as shown in Figure 3.

Referring now more particularly to the improved means of actuating the brake mechanism above described, it will be observed in Figures 1 and 2 that the lower end 60 of the pivotal pin 13 which is rigid with the main axle as before described, extends below the lower bearing arm 17 of the wheel axle and is provided with an outwardly curved bearing support 61. The lower extremity of this support provides a fulcrum for an inwardly extending operating lever 64, this fulcrum being positioned on the outside of the longitudinal axis of the pivot pin 13, for example, toward the wheel 10, as clearly shown in Figure 2. The point of pivotal connection between the lever arm 64 and the bearing support 61 by preference consists of a sliding connection comprising a ball 62 working in a hole 63 in said bearing support. The operating lever 64 has a relatively long arm 65 extending outwardly through a slot 70 in the cover plate 26 and curving around the main axle 15 and is engaged with a rod 67 at a point substantially above said axle as shown in Figure 1. This rod 67 may be operatively connected with the brake operating mechanism of the vehicle in any approved manner.

The lever arm 64 forms operative connection between the brake and the brake operating mechanism carried by the vehicle frame in the following manner. A yoke 71 is pivotally connected to a pin 72 extending through the lever 64 adjacent its fulcrum. The yoke 71 has a shank 73 threaded at its inner end in a stud 74, while a collar 75 is mounted on the outer end of said yoke shank, said collar being movable longitudinally of said shank and within a recess 76 formed in the free end of the brake member 29. A compression spring 78 is interposed between said collar 75 and a shoulder 79 at the inner end of the recess 76, the arrangement being such that the outer end 80 of the brake member is maintained in bearing engagement with the stud 74. As shown herein, the yoke pivot pin 72 is on an axis disposed at an angle to the pivot pin 13 but the yoke and its shank is arranged to be actuated tangentially of the brake band, with the longitudinal axis of the shank substantially intersecting the axis of said pivot pin when the brake mechanism is in set position.

It will be thus seen that when the operating lever 64 is actuated this power is transmitted through a yoke 71 and associated parts directly to the brake band in a direction substantially tangential thereto so as to expand the same into frictional braking engagement with brake drum. As before suggested, the parts are arranged that when the brake is in fully engaged position, the longitudinal axis of the pivot pin 13 extended intersects the longitudinal axis of the yoke 71 where it is pivotally connected to the operating lever 64, or, in short, the mean point of operative connection between yoke 71 and lever 64 is substantially in alignment with the axis of the pivot pin. Thus, when the wheel spindle is swung on the pivot pin 13 for steering in either direction, the tension on the yoke 71 and the brake band will be unaffected by such steering movement. The brake is released by releasing the pressure of lever arm 64 on brake member 28. The movement of said brake members is preferably limited by the adjusting devices heretofore described so that the brake member is maintained under tension of springs 56 and 58 when the brake is released. The tension spring 78 serves to maintain the bearing end 80 and stud in mutual engagement so as to prevent rattling when the brake is released.

There are points intermediate the points of minimum and maximum pressure on the brake band at which the mean pivotal connection of yoke 71 with operating lever 64 is not in substantial axial alignment with the pivot pin 13 but when the brake is properly adjusted this variation is so small that it is practically negligible, and has no appreciable effect on the successful and positive action of the brake. The wear incident to the use of the brake may be readily compensated for by readjusting the brake bands from time to time so that the actuating lever 64 is maintained in the desired angular position relative to the main axle and to the brake band when the latter is in engaged position. This adjustment is afforded by circumferential movement of the base plate 34 supporting the fixed end of the brake member 28, or by rotating the adjusting arm 18 and pivot pin 13.

The advantage of a brake mechanism constructed as above described is the simplicity and durability of such structure in which a minimum of moving and wearing parts are required. The power of the actuating lever 64 in the main axle is applied directly to the brake band without the use of interposed shafts, universal joints or similar connecting devices between the main axle and the wheel in the manner usually employed in devices of similar character.

While I have illustrated and described one particular embodiment of my invention, it will be understood that I do not wish to be limited to the exact construction shown and described, but that various changes and modifications may be made without departing from the spirit and scope of my invention as defined in the appended claims.

I claim:

1. In combination with a vehicle axle having a wheel and spindle mounted for pivotal steering movement on a substantially vertical pivot pin, a brake drum carried by the wheel, brake means supported by the wheel spindle, and means for operatively engaging said brake means with said drum, comprising a lever pivotally supported on a bearing rigid with said axle and having intermediate pivotal connection with said brake means, said connection being movable transversely of and in a path substantially intersecting the axis of said pivot pin.

2. In combination with a vehicle axle having a wheel and spindle mounted for pivotal steering movement on a substantially vertical pivot pin, a brake drum carried by the wheel, brake means supported by the wheel spindle, and means for operatively engaging said brake means with said drum, comprising a lever pivotally supported on a bearing rigid with said axle having its axis substantially in a vertical plane including the axis of said pivot pin, said lever having intermediate pivotal connection with said brake means, said connection being movable transversely of and in a path substantially intersecting the axis of said pivot pin.

3. In combination with a vehicle axle having a wheel and spindle mounted for pivotal steering movement on a substantially vertical pivot pin, a brake drum carried by the wheel, brake means supported by the wheel spindle, and means for operatively engaging said brake means with said drum, comprising a lever pivotally supported on a bearing rigid with said axle and having intermediate pivotal connection with said brake means said connection being movable transversely of and in a path substantially intersecting the axis of said pivot pin and means affording circumferential adjustment of said brake means.

4. In combination with a vehicle axle having a wheel and spindle mounted for pivotal steering movement on a substantially vertical pivot pin, a brake drum carried by the wheel, brake means supported by the wheel spindle, and means for operatively engaging said brake means with said drum, comprising a lever pivotally supported on a bearing rigid with said axle and having intermediate pivotal connection with said brake means, said connection being movable tangentially of said brake and in a path substantially intersecting the axis of said pivot pin.

5. In a combination with a vehicle axle having a wheel and spindle mounted for pivotal steering movement on a substantially vertical pivot pin, a brake drum carried by the wheel, brake means supported by the wheel spindle, and means for operatively engaging said brake means with said drum, comprising a lever pivotally supported on a bearing rigid with said axle and having intermediate pivotal fulcrumed connection with said brake means, said connection being movable tangentially of said brake and in a path substantially intersecting the axis of said pivot pin and means affording circumferential adjustment of said brake means.

6. In combination, an axle having a wheel and spindle pivotally mounted on a pivot pin, a brake drum on said wheel, a brake supported by said spindle and means for moving said brake into operative engagement with said drum, comprising a lever on a part rigid with said axle, and a link connecting said lever and brake, movable tangentially of said brake band and having connection with said lever at a point substantially movable into alignment with the axis of said pivot pin when said brake is operably engaged with said drum.

7. In combination, an axle having a wheel and spindle pivotally mounted on a pivot pin, a brake drum on said wheel, an expansion brake band supported adjacent one end by said spindle relatively free at the other end, said band being adapted for interior operative engagement with said drum, tension means normally maintaining said brake band in inoperative position, and means for positively actuating said band comprising a lever fulcrumed on a part rigid with said axle and having an arm movable transversely of the axis of said pivot pin, said arm being pivotally connected intermediate its ends with the free end of said band at a point adapted to substantially coincide with the axis of said pivot pin.

8. In combination, an axle having a wheel and spindle pivotally mounted on a pivot pin, a brake drum on said wheel, an expansion brake band supported adjacent one end by said spindle relatively free at the other end, said band being adapted for interior operative engagement with said drum, tension means normally maintaining said brake band in inoperative position, and means for positively actuating said band comprising a lever fulcrumed on a part rigid with said axle and having an arm movable transversely of the axis of said pivot pin, said arm being pivotally connected with the free end of said band at a point adapted to substantially coincide with the axis of said pivot pin and means for adjusting said supported end of said brake band circumferentially.

9. In combination with a vehicle axle having a wheel and spindle mounted for pivotal steering movement on a pivot pin, a brake drum carried by the wheel, brake means supported on the wheel spindle, a lever fulcrumed on a part rigid with said pivot pin and moving in a plane disposed transversely to the axis of the latter, and means pivotally connecting said lever with said brake means at a point movable in a path substantially intersecting the axis of said pivot pin.

10. In combination with a vehicle axle having a wheel and spindle mounted for pivotal steering movement on a pivot pin, a brake drum carried by the wheel, brake means supported on the wheel spindle, a lever fulcrumed on a part rigid with said pivot pin and moving in a plane disposed transversely to the axis of the latter and means pivotally connecting said lever with said brake means at a point movable in a path substantially intersecting the axis of said pivot pin and means for adjusting said brake means circumferentially of said spindle.

11. In combination with a vehicle axle having a wheel and spindle mounted for pivotal steering movement on a pivot pin, a brake drum carried by the wheel, brake means supported on the wheel spindle, a lever fulcrumed on a part rigid with said pivot pin and means pivotally connecting said lever with said brake means at a point movable in a path substantially intersecting the axis of said pivot pin and means for adjusting said pivot pin.

12. In combination with a vehicle axle having a wheel and spindle mounted for pivotal steering movement on a pivot pin, a brake drum carried by the wheel, brake means supported on the wheel spindle, a lever fulcrumed on a part rigid with said pivot pin and offset outwardly toward said wheel and means pivotally connecting an intermediate part of said lever with said brake means at a point movable in a path substantially intersecting the axis of said pivot pin.

13. In combination with a vehicle axle having a wheel and spindle mounted for pivotal steering movement on a pivot pin, a brake drum carried by the wheel, brake means supported on the wheel spindle, a lever having one end thereof fulcrumed in sliding engagement on a part rigid with said pivot pin and moving in a plane disposed transversely to the axis of the latter and means pivotally connecting said lever with said brake means at a point movable in a path substantially intersecting the axis of said pivot pin.

14. In combination with a vehicle axle having a wheel and spindle mounted for pivotal steering movement on a pivot pin, a brake drum carried by the wheel, brake means supported on the wheel spindle, a lever fulcrumed on a part rigid with said pivot pin and moving in a plane disposed transversely to the axis of the latter and means substantially rigid with said brake means pivotally connected with said lever at a point movable in a path substantially intersecting the axis of said pivot pin.

15. In combination with a vehicle axle having a wheel and spindle mounted for pivotal steering movement on a pivot pin, a brake drum carried by the wheel, brake means supported on the wheel spindle, a lever fulcrumed on a part rigid with said pivot pin and moving in a plane disposed transversely to the axis of the latter and means substantially rigid with said brake means pivotally connected with said lever at a point movable in a path substantially intersecting the axis of said pivot pin and means for adjusting said brake means circumferentially.

Signed at Kenosha, Wis., this 20th day of June, 1924.

NILS ERIK WAHLBERG.